(12) United States Patent
Ehrensberger et al.

(10) Patent No.: US 9,007,184 B2
(45) Date of Patent: Apr. 14, 2015

(54) METHOD FOR OPERATING A HOUSEHOLD APPLIANCE, PORTABLE OPERATING UNIT AND HOUSEHOLD APPLIANCE

(75) Inventors: Julia Ehrensberger, München (DE); Frank Rieser, Gröbenzell (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 435 days.

(21) Appl. No.: 13/266,560

(22) PCT Filed: Apr. 20, 2010

(86) PCT No.: PCT/EP2010/055180
§ 371 (c)(1),
(2), (4) Date: Oct. 27, 2011

(87) PCT Pub. No.: WO2010/124966
PCT Pub. Date: Nov. 4, 2010

(65) Prior Publication Data
US 2012/0092139 A1    Apr. 19, 2012

(30) Foreign Application Priority Data

Apr. 30, 2009    (DE) .................. 10 2009 002 774

(51) Int. Cl.
*G05B 11/01* (2006.01)
*F24C 7/08* (2006.01)
*F24C 15/20* (2006.01)

(52) U.S. Cl.
CPC ............. *F24C 7/082* (2013.01); *F24C 15/2021* (2013.01)

(58) Field of Classification Search
CPC ........ G08C 17/00; G08C 17/02; G08C 19/28; G08C 23/04; G08C 2201/92; G08C 2201/91; H04B 3/54; H04B 2203/5483; G05B 19/0423; F24C 7/082; F24C 5/16; G07C 9/00182; F25D 29/00; F25D 29/005; F25B 49/005; D06F 33/02; D06F 39/005
USPC ......... 340/12.22–12.55, 3.1, 3.7, 3.71; 700/9, 700/11, 12
See application file for complete search history.

(56) References Cited

U.S. PATENT DOCUMENTS 5,839,097 A    11/1998  Klausner
6,198,079 B1 *  3/2001  Essig ............................. 219/497

(Continued)

FOREIGN PATENT DOCUMENTS

EP    0600780 B1    1/1997

OTHER PUBLICATIONS

International Search Report PCT/EP2010/055180.
Report of Examination EP 10 719 294 dated Jan. 13, 2014.

*Primary Examiner* — Brian Zimmerman
*Assistant Examiner* — Laura Nguyen
(74) *Attorney, Agent, or Firm* — James E. Howard; Andre Pallapies

(57) ABSTRACT

In a method for operating a household appliance, a portable operating unit is docked to a selected one of a plurality of household appliances. The selected household appliance is identified using the portable operating unit which is then configured to operate the selected household appliance only. The portable operating unit includes at least one docking element for docking to a docking station of the selected household appliance, an identification device for identifying the selected household appliance, and a configuration device for configuration of the operating unit for operating the selected household appliance only.

20 Claims, 2 Drawing Sheets

(56) References Cited

U.S. PATENT DOCUMENTS

| | | |
|---|---|---|
| 2003/0178290 A1 | 9/2003 | Schilling |
| 2005/0096760 A1* | 5/2005 | Sturm et al. .................. 700/65 |
| 2006/0031457 A1* | 2/2006 | Motoyama .................. 709/224 |
| 2007/0171091 A1* | 7/2007 | Nisenboim et al. ...... 340/825.69 |
| 2009/0118848 A1* | 5/2009 | Santinato et al. ............... 700/90 |

* cited by examiner (12)

METHOD FOR OPERATING A HOUSEHOLD APPLIANCE, PORTABLE OPERATING UNIT AND HOUSEHOLD APPLIANCE

BACKGROUND OF THE INVENTION

The invention relates to a method for operating a household appliance, a portable operating unit for operating a household appliance and a household appliance.

For operating a household appliance, said household appliance frequently has an operating and display field integrated in a control panel.

Alternatively, a portable operating unit is known which may be docked to a household appliance and which is capable of operating simultaneously all household appliances in the vicinity which are designed for this purpose. Said operating unit may also be arranged separately from a household appliance and accordingly operate the household appliances remotely.

Fixed central operating systems are also known for operating a plurality of household appliances.

It is also known to operate household appliances from a computer, an electronic hand-held device or a mobile telephone.

BRIEF SUMMARY OF THE INVENTION

It is the object of the present invention to provide the possibility of operating household appliances, which may be implemented in a simple manner and which facilitates the cleaning of the household appliance.

This object is achieved according to the features of the independent claims. Preferred embodiments may be derived, in particular, from the dependent claims.

The method serves for operating a household appliance and comprises the following steps: docking a portable operating unit to the household appliance; identifying the household appliance by means of the portable operating unit and configuring the portable operating unit for operating said household appliance only.

In contrast to household appliances with an integrated operating and display field, here it is possible to achieve greater capacity for cleaning by the ability to remove the operating unit in a manner which is, in principle, simple and rapid. A smoother, higher quality design of the associated surface may also be achieved. Moreover, the respective integrated operating and display fields may be dispensed with which, in particular, permits economical household appliances.

In contrast to computers, hand-held devices, etc., due to the automatic identification of the household appliance, after the docking process a user of a household appliance does not have to be involved in any unusual or complex interaction (recall of specific programs, activating communication lines, etc.) for activating the portable operating unit. Also, the portable operating unit is able to be designed to be much simpler and less susceptible to faults.

In contrast to a portable operating unit which is able to operate a plurality of household appliances simultaneously, the portable operating unit is able to be designed much more simply by concentrating on the operation of just one household appliance and thus may be produced more cheaply. Thus, the possibility for multi-appliance communication does not have to be provided in the portable operating unit. When operating just one household appliance, in particular, it is possible to dispense with networking the household appliances. Also, the operation becomes clearer.

Due to its potential use with a plurality of household appliances, the portable operating unit is able to be produced in high quantities and thus particularly cost-effectively.

The portable operating unit may have at least one operating and/or display element. Operating elements may comprise switches, keys, sliders, etc., display elements may comprise LED screens, LCD screens, TFT screens, segment displays, etc. and also touchscreens.

One configuration may comprise a visual display of corresponding user interfaces.

One possible embodiment is that the method comprises the following steps: undocking or removing the portable operating unit from the household appliance and thereby switching off the household appliance. Thus it is always possible to react to undesirable handling or malfunction of the household appliance in good time. However, household appliances may also exist which continue to operate after undocking the portable operating unit.

The object is also achieved by a portable operating unit for operating a household appliance, the portable operating unit having at least: one docking means for docking to the household appliance; one identification means for identifying the household appliance and one configuration means for configuring the portable operating unit for operating said household appliance (only).

In the configuration, therefore, the portable operating unit is configured such that it can only operate the household appliance to which it is docked. In particular, both the portable operating unit may be fastened to the household appliance and a functional coupling to the household appliance may be made as a result of the docking means.

One possible development is that the docking means comprises a wired external interface. As a result, a connection which is particularly simple to implement and interference-free may be produced between the portable operating unit and the household appliance. Said wired external interface may be a proprietary interface or a standard interface, such as a USB interface.

One further development may be that the docking means comprises a short-range wireless external interface. By means of the short range, for example of up to 2 cm to 10 cm, cross-talk with other communication channels may be avoided. The wireless external interface is able to dispense with a physical connection element (plug, etc.) and, as a result, is particularly easy to clean and visually unobtrusive.

According to a further development, the portable operating unit may comprise an energy absorption means. The portable operating unit may be supplied with energy via the energy absorption means, for example to ensure continuous operation and/or to charge a battery. The energy absorption means may be integrated in the docking means or functionally connected thereto. Where the wired external interface is integrated or functionally connected, a power supply line may be provided to this end as the energy absorption means. Where the wireless external interface is integrated or functionally connected, for example, energy may be transmitted by a corresponding electromagnetic field from the household appliance to the portable operating unit, the portable operating unit being able to comprise at least one induction coil as the energy absorption means.

One further embodiment may be that the portable operating unit comprises an external computer interface for connecting to a computer, for example a USB connection. Said external computer interface may correspond to at least one interface with the household appliance or may be a separate interface. The portable operating unit may be updated via the computer interface, for example by adding further appliances, with which the portable operating unit may cooperate, or by updating the configuration of the portable operating unit (for example with new recipes for implementing cooking programs of an oven). One embodiment is that the portable operating unit may be connected to a network, for example the Internet, via the computer.

A further embodiment may be that the portable operating unit comprises a standardized user guide for the household appliances which are able to be operated. A standardized user guide may comprise displays which are visually configured according to the same layout or design and/or menu structures which are configured according to the same design. As a result, a reliable user guide may be achieved for some or all of the household appliances which may be operated by the portable operating unit, which increases ease of operation.

One further embodiment may also be that the portable operating unit comprises a communication unit for in-house communication with household appliances to be identified, if the portable operating unit is not docked to one of the household appliances to be identified. As a result, a portable operating unit, for example, may be used for monitoring the status of household appliances if it is not used for operating a specific household appliance.

The object is also achieved by a household appliance which has a docking station for docking the portable operating unit, as claimed in one of the preceding claims.

The docking station may, for example, provide a mechanical holder and/or a magnetic holder for fastening the portable operating unit. A mechanical holder may comprise a plug-in or push-in unit (for example a so-called cradle), a mounting unit (for example a recess), a suspension unit and/or a latching unit, etc.

One embodiment is that the docking station is integrated in a front face of the household appliance and comprises a mounting surface protruding from the front face for positioning the portable operating unit. As a result, a secure stand of the portable operating unit may be achieved.

A further embodiment is that the docking station is integrated in a front face of the household appliance and comprises a folding mechanism for folding out the portable operating unit from a substantially perpendicular position. As a result, in particular with household appliances arranged at a lower level, in particular undermounted appliances, operation is simplified as the portable operating unit may be pivoted toward a user which simplifies handling.

Alternatively the folding mechanism may also be integrated in the portable operating unit (for example on a rear face) in order to keep the front face of the household appliance economical, easily cleanable and of high quality appearance.

The folding mechanism may be designed so that it may be used as a supporting mechanism for positioning the portable operating unit on a free surface. This has the advantage that the portable operating unit (for example for status monitoring) may also be advantageously positioned securely and ergonomically, independently of a docking station.

A further embodiment may be that the docking station is integrated in a front face of the household appliance and comprises a surface oriented obliquely upward and/or a region positioned obliquely upward, on which the portable operating unit may be releasably fastened. As a result, a user may also achieve a comfortable viewing angle of the portable operating unit even without a folding mechanism. The obliquely positioned region may also be easily cleaned and may be discrete in terms of design. Providing the obliquely positioned region may be advantageous, in particular with undermounted appliances, specifically with an oven.

A further embodiment is that the household appliance, apart from the portable operating unit, has a least one further fixedly installed operating and/or display element. As a result, an at least rudimentary operation of the household appliance may be maintained even in the event of malfunction of the portable operating unit (for example in the event of loss of charge or low charging level of the portable operating unit). For safety reasons, it is particularly preferred if the at least one fixedly installed operating and/or display element comprises a master switch.

The object is also achieved by a system consisting of at least one portable operating unit and at least one household appliance.

BRIEF DESCRIPTION OF THE DRAWINGS

In the following figures, the invention is described schematically with reference to an exemplary embodiment. In this case, for the sake of clarity, the same or functionally the same elements may be provided with the same reference numerals.

DETAILED DESCRIPTION OF EXEMPLARY EMBODIMENTS OF THE PRESENT INVENTION

Figure 1:
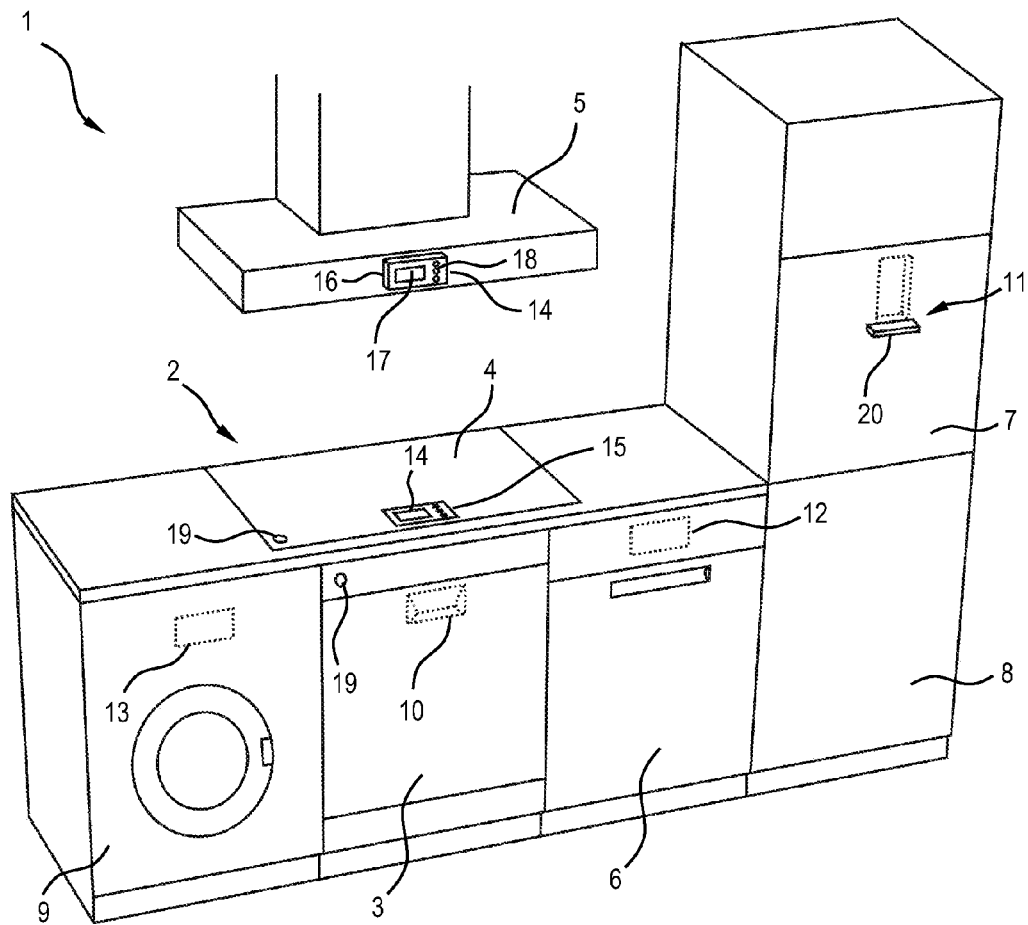
FIG. 1 shows in a view obliquely from the front a fitted kitchen with a plurality of household appliances, of which two are provided with a portable operating unit.

FIG. 1 shows in a view obliquely from the front a fitted kitchen 1 with a plurality of household appliances in the form of kitchen appliances, namely a stove 2 with an oven 3 and a cook zone 4, an extractor fan or hood 5, a dishwasher 6, a refrigerator 7 and a freezer 8. Moreover, a washing machine 9 is integrated in the fitted kitchen 1. Each of the household appliances 3 to 9 has a docking station 10 to 13 indicated here in dotted lines. Portable operating units 14 are docked to the docking stations 15, 16 of the cook zone 4 or the hood 5 respectively. The portable operating units 14 are designed in the same manner and in each case are able to be docked to each of the household appliances 3 to 9 provided with a docking station 10 to 13, 15, 16.

For operating one of the household appliances 3 to 9 it is provided to dock, and as a result to fasten, a portable operating unit 14 to the associated docking station 10 to 13, 15, 16. The fastening may be carried out, for example, mechanically (by pushing-in, positioning, suspending, latching, etc.) or magnetically and may depend on the type of household appliance 3 to 9.

Thus the portable operating unit 14 is inserted into a docking station in form of a recess 15 on the upper face of the cook zone 4, for docking to the cook zone 4, and held there magnetically. As a result of the docking, a short-range wireless communication channel is opened between the cook zone 4 and the portable operating unit 14. To this end, the two devices 4, 14 have in each case a wireless interface. Moreover, energy may be transmitted wirelessly from the cook zone 4 to the portable operating unit 14, for example for charging a battery of the portable operating unit 14. To this end, the cook zone 4 has a magnetic field generating unit (not illustrated) for generating a magnetic field at the location of the portable operating unit 14, whilst the portable operating unit 14 has an energy absorption means in the form of at least one induction coil (not illustrated) for obtaining energy from the magnetic field. The magnetic field generating unit and the at least one induction coil may form part of the respective interface.

By opening the communication channel, the portable operating unit 14 identifies the cook zone 4 and is configured such that it appears as an operating unit of the cook zone 4 only. To this end, corresponding user interfaces are displayed for operating the cook zone 4 only.

For identifying the household appliance 4, 5 connected communicatively therewith, the portable operating unit 14 is provided with an identification means. The configuration means may, for example, comprise a data storage device. In the data storage device, for example, a look-up table may be stored, which links an identifier received via the communication channel to a predetermined household appliance. The identifier may also be transmitted at least partially in plain text.

For its configuration with the household appliance 4, 5, which is communicatively connected thereto, the respective portable operating unit 14 is further provided with a configuration means. The configuration means may, for example, comprise a data storage means in which operating information associated with predetermined identifiable household appliances, such as menu structures, information text, key assignment, may be stored. The operating procedures may also include recipes, etc. in the course of an operating procedure of the oven 3 and/or the cook zone 4.

The configuration means and the identification means may be a combined configuration and identification means which, for example, comprises a common data storage device.

The data storage device may be at least writable for updates and, for example, may be present in the form of an EEPROM. For updating, the portable operating unit 14 may comprise an external computer interface for connecting to a computer, for example a USB interface. Said computer interface may correspond to the at least one interface for communication with the household appliance 3 to 9, or may be a separate interface.

When the communication channel between the portable operating unit 14 and the cook zone is open, a user is not able to operate or monitor another household appliance 3, 5 to 9 by means of said portable operating unit 14.

By undocking or removing the portable operating unit 14 from the cook zone 4 or from the recess 15, the short-range communication channel is broken. This is identified by the cook zone 4, and the cook zone 4 reacts thereto at least by switching off its associated hot plates, optionally also by the cook zone 4 being completely switched off.

The same or a similar portable operating unit 14 may also be docked to a front face of the hood 5, as shown here, by being held magnetically there. As a result of the docking process, the portable operating unit 14 identifies the hood 5 and is configured so that it appears as an operating unit for the hood 5 only. A user is not able to operate or monitor another household appliance 3, 4, 6 to 9. By undocking or removing the portable operating unit 14 from the hood 5, the hood 5 switches itself off.

The portable operating unit 14 is also provided with a communication unit for in-house communication, for example with a bluetooth transceiver, so that it can communicate with one or more household appliances 3 to 9 over a greater distance, for example of up to approx. 10 m or 20 m, if it is not docked to one of said household appliances 3 to 9. The communication may also take place with household appliances 3 to 9 to which a different portable operating unit 14 is already docked. The communication between the household appliance 3 to 9 and the undocked portable operating unit 14 may take place via the communication units for in-house communication between the docked portable operating unit 14 and the undocked portable operating unit 14. The undocked portable operating unit 14 may, for example, be used for status queries (remaining duration of a cooking process, remaining duration of a washing process, etc.).

A portable operating unit 14 may be included when purchasing one of the household appliances 3 to 9, so that after purchasing a plurality of household appliances 3 to 9 designed and equipped for cooperating with the portable operating unit 14, a user also has a plurality of portable operating units 14. If all household appliances 3 to 9 designed in this manner are not operated at the same time, portable operating units 14 become spare and may be used, for example, for status monitoring. Each of the portable operating units 14 present may be used for docking to one of the household appliances 3 to 9.

The portable operating unit 14 in this case has an LCD screen 17 as the display unit and mechanical short-stroke keys 18 as operating elements. At least the oven 3 and the cook zone 4 have a further operating element, for the operation thereof, in the form of an on/off switch 19.

Figure 2:
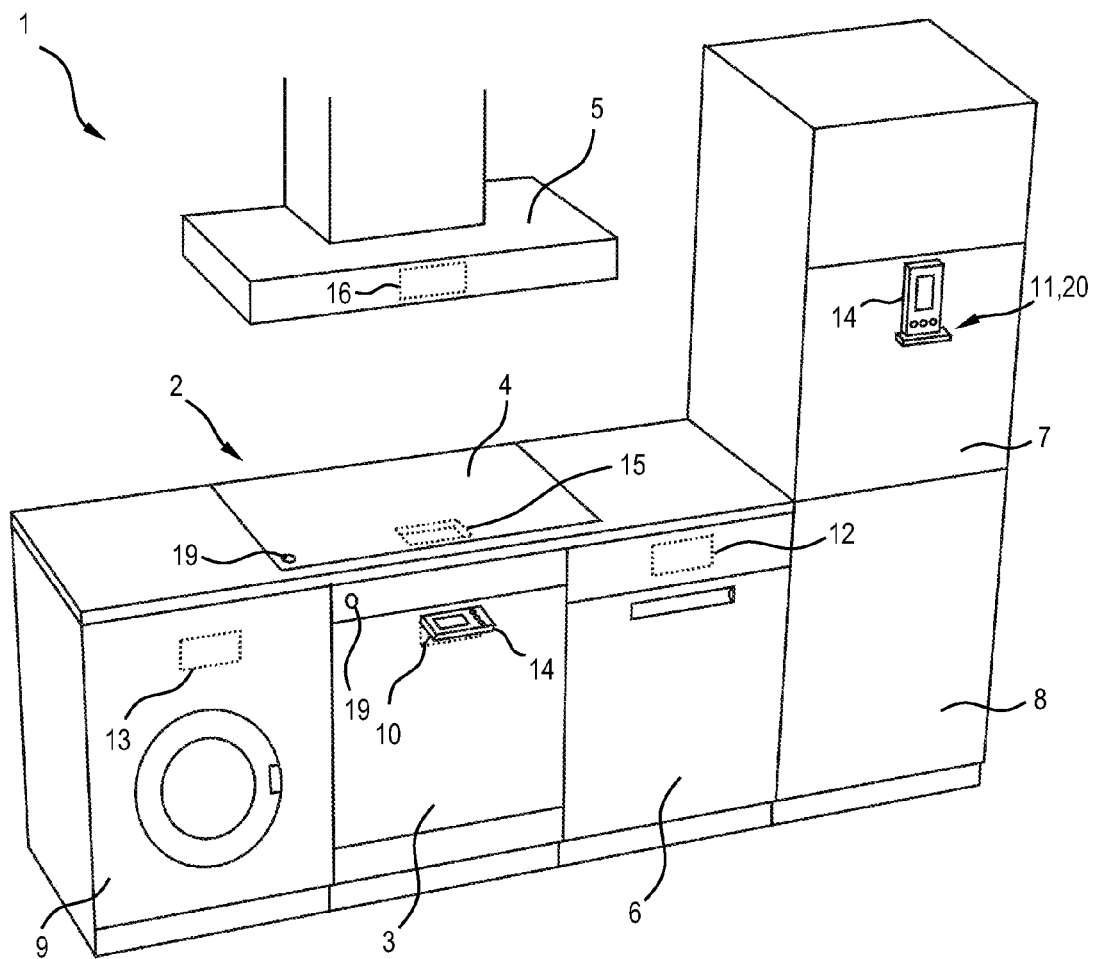
FIG. 2 shows the fitted kitchen of FIG. 1, two other household appliances being provided with a portable operating unit.

FIG. 2 shows the fitted kitchen 1 of FIG. 1, other household appliances being provided with a portable operating unit 14, namely the oven 3 and the refrigerator 7.

The docking station 11 of the refrigerator 7 is designed so that it has a mounting surface 20 protruding from the front face for positioning the portable operating unit 14. A plug (not illustrated) is incorporated in the mounting surface 20 as the wired interface, onto which a suitable socket as the wired interface of the portable operating unit 14 may be positioned and namely both for data communication between the refrigerator 7 and the portable operating unit 14 and for supplying power to the portable operating unit 14. By means of the mounting surface 20, a secure stand of the portable operating unit 14 may be achieved, for example similar to a so-called cradle. The docking station 11 may be additionally provided with a recess (not illustrated) formed above the mounting surface 20 in the front face of the refrigerator 7, in order to assist a secure seat of the portable operating unit 14.

The docking station 10 of the oven 3 is integrated in a front face of the oven 3 and has a folding mechanism (not illustrated) for folding out the portable operating unit 14 from a substantially perpendicular position toward a user. The portable operating unit 14 is shown in this case in the folded-out position, in which a user may comfortably operate the oven 3 when standing.

Naturally, the present invention is not limited to the exemplary embodiment shown.

Thus, in a further embodiment the portable operating unit may have just one (wired or wireless) external interface to the household appliance.

The portable operating unit may also have just one touchscreen instead of separate operating elements and display field(s).

The portable operating unit may be flexible for adapting to curved surfaces.

The portable operating unit may continue to run or switch itself off depending on the docked household appliance when the portable operating unit is removed. Switching off is preferred, in particular, in the case of a cook zone.

LIST OF REFERENCE NUMERALS

1 Fitted Kitchen
2 Stove
3 Oven
4 Cook Zone
5 Hood

6 Dishwasher
7 Refrigerator
8 Freezer
9 Washing Machine
10 Docking Station
11 Docking Station
12 Docking Station
13 Docking Station
14 Portable Operating Unit
15 Docking Station/Cook Zone Recess
16 Docking Station
17 LCD Screen
18 Short-stroke Key
19 On/off Switch
20 Mounting Surface

The invention claimed is:

1. A method for operating a household appliance, comprising the steps of:
   docking a first portable operating unit to a selected one of a plurality of different household appliances, wherein each appliance of the plurality of different household appliances has a docking station configured to receive a first portable operating unit, wherein the first portable operating unit and docking station configuration are common to every appliance in the plurality of different household appliances;
identifying the selected household appliance using the first portable operating unit;
transmitting program data related to operation of the selected and docked household appliance from the selected and docked household appliance to the first portable operating unit;
   receiving the program data related to operation of the selected and docked household appliance in the first portable operating unit; and
   configuring the first portable operating unit for operating the selected and docked household appliance only using the program data related to operation of the selected and docked household appliance transmitted from the selected and docked household appliance and received by the first portable operating unit, thereby operating one of the plurality of different household appliances using the first portable operating unit capable of controlling each household appliance of the plurality of different household appliances one at a time only when docked with the selected household appliance; and
   monitoring the status of the selected household appliance of the plurality of household appliances using a second portable operating unit that is not docked with any appliance of the plurality of appliances, the second portable operating unit being the same as the first portable operating unit wherein the second portable operating unit communicates with the first portable operating unit regarding the status of the appliance with which the first portable operating unit is docked.

2. The method of claim 1, further comprising undocking the first portable operating unit from the selected household appliance, thereby switching off the selected household appliance.

3. A portable operating unit for operating a household appliance, comprising:
   at least one docking element for docking to a selected one of a plurality of household appliances;
   an identification device for identifying the selected and docked household appliance; a receiver for receiving program data related to operation of the selected and docked household appliance transmitted from the selected and docked household appliance; and
   a configuration device for configuration of the operating unit for operating the selected and docked household appliance only according to the program data received from the selected and docked household appliance, wherein each of the plurality of household appliances is different and the portable operating unit is capable of operating each household appliance of the plurality of household appliances, wherein each household appliance of the plurality of household appliances has a docking station configured to receive a portable operating unit, wherein the portable operating unit and docking station configuration are common to every appliance in the plurality of household appliances wherein the portable operating unit is configured for communication with a second, duplicate portable operating unit that is not docked with any appliance for monitoring the status of the appliance that is docked with the portable operating unit.

4. The portable operating unit of claim 3, wherein the docking element comprises a wired external interface.

5. The portable operating unit of claim 3, wherein the docking element comprises a short-range wireless external interface.

6. The portable operating unit of claim 3, wherein the docking element comprises an energy absorption member.

7. The portable operating unit of claim 3, further comprising a computer interface for connecting to a remote computer.

8. The portable operating unit of claim 3, further comprising a standardized user guide for use with the plurality of household appliances to be operated.

9. The portable operating unit of claim 3, further comprising a communication unit for in-house communication with the plurality of household appliances to be identified in the absence of a docking of the portable operating unit to one of the plurality of household appliances to be identified.

10. A household appliance, comprising a docking station for docking a first portable operating unit, a transmitter for transmitting program data for operating the household appliance, wherein the first portable operating unit includes at least one docking element for docking to the docking station of a selected one of a plurality of household appliances, an identification device for identifying the selected household appliance, a receiver for receiving program data related to operation of the selected household appliance transmitted from the selected household appliance and a configuration device for configuration of the portable operating unit for operating the selected household appliance only wherein program data related to operation of the selected household appliance is transmitted from the selected household appliance and wherein the program data is received by the first portable operating unit for controlling the selected household appliance only according to the program data and wherein each of the plurality of household appliances is different and the first portable operating unit is capable of operating each household appliance of the plurality of household appliances, wherein each household appliance of the plurality of household appliances has a docking station configured to receive the first portable operating unit, wherein the first portable operating unit and docking station configuration are common to every appliance in the plurality of household appliances and wherein each appliance of the plurality of appliances is configured for being monitored by a second portable operating unit not docked with an appliance and the first portable operating unit is docked with the appliance, the second portable operating unit being the same as the first portable operating unit wherein the second portable operating unit communicates with the first portable operating unit regarding the status of the appliance with which the first portable operating unit is docked.

11. The household appliance of claim 10, wherein the docking element comprises a wired external interface.

12. The household appliance of claim 10, wherein the docking element comprises a short-range wireless external interface.

13. The household appliance of claim 10, wherein the docking element comprises an energy absorption member.

14. The household appliance of claim 10, further comprising a computer interface for connecting to a remote computer.

15. The household appliance of claim 10, further comprising a standardized user guide for use with the plurality of household appliances to be operated.

16. The household appliance of claim 10, further comprising a communication unit for in-house communication with the plurality of household appliances to be identified in the absence of a docking of the portable operating unit to one of the plurality of household appliances to be identified.

17. The household appliance of claim 10, wherein the docking station is integrated in a front face of the household appliance and comprises a mounting surface protruding from the front face for positioning the portable operating unit.

18. The household appliance of claim 10, wherein the docking station is integrated in a front face of the household appliance and comprises a folding mechanism for folding out the portable operating unit from a substantially perpendicular position.

19. The household appliance of claim 10, wherein the docking station is integrated in a front face of the household appliance and comprises a surface oriented obliquely upward for fastening the portable operating unit.

20. The household appliance of claim 10, further comprising at least one fixedly installed operating and/or display element for allowing operation and/or display in the presence of a malfunction of the operating unit.

\* \* \* \* \*